Figure 1:
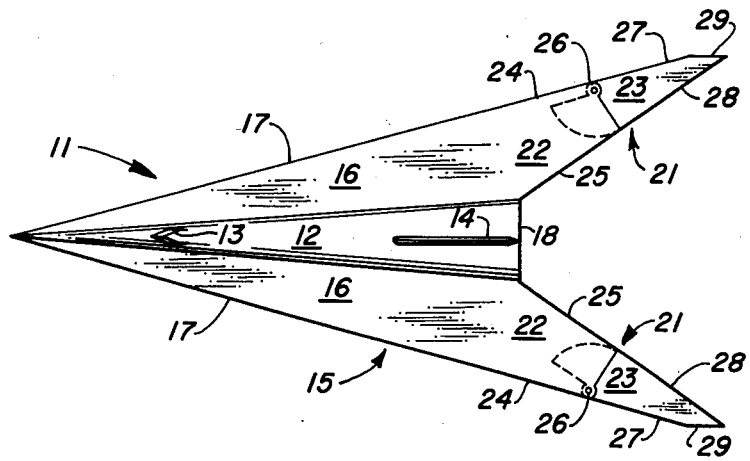

April 30, 1963  J. G. LOWRY  3,087,692
VARIABLE-SPAN AIRCRAFT
Filed Jan. 25, 1961

INVENTOR
JOHN G. LOWRY

BY

ATTORNEYS

United States Patent Office 3,087,692
Patented Apr. 30, 1963

3,087,692
VARIABLE-SPAN AIRCRAFT
John G. Lowry, Hornsbyville, Va., assignor to the United States of America as represented by the Administrator of the National Aeronautics and Space Administration
Filed Jan. 25, 1961, Ser. No. 84,961
9 Claims. (Cl. 244—46)
(Granted under Title 35, U.S. Code (1952), sec. 266)

The invention described herein may be manufactured and used by or for the Government of the United States of America for governmental purposes without the payment of any royalties thereon or therefor.

This invention relates generally to aerial vehicles, and more particularly to supersonic airplanes having variable sweep wing sections.

The invention is considered to be particularly useful for application to civil and military transport or military bombardment aircraft having high supersonic speed capabilities on the order, say, of Mach 3.0. The airframe configuration requirements for efficient supersonic flight, however, especially in the indicated range and higher, are simply not compatible with the configuration requirements for efficient low speed flight, takeoff and climb, or descent and landing. The optimum wing planform for low speed flight, and conventional takeoff and landing, is considered to include a long span, narrow chord wing having a low sweep angle. The total lift developed by a lifting wing, other factors such as angle of attack and dynamic pressure being equal, is substantially proportional to aspect ratio, which is defined as the square of the span of the wing divided by the surface area thereof. It will be immediately apparent, therefore, that a long narrow wing may develop many multiples of the total lift obtainable with a short broad wing of the same plan area, thereby reducing the angle of attack required for landing and takeoff. Moreover, the drag due to lift is reduced as the aspect ratio is increased, thereby providing high aerodynamic efficiency for subsonic cruise. The high aspect ratio wing, of course, permits relatively short takeoff and landing roll, as well as low speed climb to altitude, thereby making feasible the use of small and relatively rough airports, which may be located even in fairly densely populated and built up areas. For transonic and supersonic flight, however, highly swept leading edge low aspect ratio wings are preferable, since aerodynamic drag may be greatly reduced thereby, and other advantages enumerated hereinafter may also be obtained. During supersonic cruise at high altitudes, at which fuel consumption per mile traveled is minimized, the highly swept leading edge wing configuration develops a comparatively low drag coefficient while developing the required lift coefficient. It has been experimentally shown that lift/drag ratios of from 6.0 to 8.0 may be obtained with the highly swept leading edge wing at supersonic high altitude cruise, making such flights economically feasible even in the case of commercial transport aircraft. The highly swept leading edge wing configuration is also preferred for supersonic flight at low levels, where the combination of high dynamic pressure and the high frequency end of the gust spectrum may establish the structural strength requirements of an aircraft, since the gust loads imposed on a highly swept leading edge wing are much smaller than on a more or less straight wing, due to a smaller change in lift force resulting from change in angle of attack. This result is due to the fact that a moving aircraft experiences atmospheric turbulence only as sudden changes in angle of attack, which may be said to be the direction of the resultant of the vertical component of gust velocity and the horizontal component of aircraft velocity. It is, of course, generally undesirable to operate supersonic aircraft at low levels; an exception being the case of military aircraft operating over enemy territory where low altitude flight is considered to reduce the vulnerability of the aircraft to attack and to increase the chances of avoiding radar detection; due to the fact that extensive shock wave damage may be experienced by buildings and like structures adjacent the flight path of an aircraft flying at supersonic speeds below an altitude of, say, 100 feet.

It will now be apparent, from the foregoing discussion, that an aircraft of the swept leading edge wing type designed solely on the basis of high supersonic, high performance flight simply will not perform satisfactorily for subsonic cruise, takeoff and landing. Even present day low supersonic speed aircraft are designed with aspect ratios higher than that considered optimum for supersonic cruising flight in order to make takeoff and landing feasible, and the takeoff ground roll distance requirements of around 10,000 feet for these aircraft are nearing an upper limit. These low supersonic aircraft must also climb to cruise altitude at subsonic speeds to prevent heavy shock wave ground damage, at the expense of increased fuel consumption, since the relatively low aspect ratio of the wings thereof results in increased drag due to lift while in the climb. The severity of this problem may be exemplified by a typical fuel consumption record of a low supersonic speed swept wing transport on a transatlantic flight, where normally 30 percent or more of the total fuel will be expended in takeoff and climb to cruise altitude at subsonic speeds.

The most promising line of attack taken in the past to overcome the configuration incompatibility problem outlined hereinbefore involves in flight variation of wing planform geometry, and particularly simultaneous variation of both wing sweep and aspect ratio. Intensive investigation of this concept began with the extensive flight testing early in the previous decade by the United States Government of one such variable aspect ratio aircraft. This aircraft was provided with in flight variable sweep wings which were movable in their entirety about longitudinally translatable pivot points closely proximate to the wing planform plane of symmetry. As the sweep angle of these wings was increased, the aerodynamic center of the wings moved rearwardly with respect to the wing pivot points, making necessary the provision of mechanism for moving the pivot points forward and keeping the aerodynamic center within a few inches to the rear of the airplane center of gravity to maintain a manageable margin of static stability. The complete flight test program of this aircraft revealed unsatisfactory stability and control characteristics, however, and it was determined that such elaborate and massive control mechanism for varying wing sweep and translating the wing pivots would be required to convert the design into a useful operational aircraft that performance penalties due to added weight resulting from the use thereof would more than offset the advantages derivable from the use of variable wing sweep. The test program on this aircraft demonstrated the feasibility of in flight wing rotation, however, and also pointed out the desirability of eliminating the need for wing translation. Subsequently, other variable sweep wing planforms were investigated both in this country and abroad by persons concerned with producing a fully operational aircraft design capable of obtaining the advantages, while avoiding the penalties, associated with variable wing sweep. One of the more extensive efforts made to overcome the problems exposed by the flight test program of the hereinbefore mentioned variable sweep wing aircraft was conducted abroad, and resulted in what is known as the "Swallow" aircraft configuration concept. This configuration, in planform, consists essentially of a long narrow delta having a leading edge sweep on the order of 75 degrees, and is characterized by a large triangular cutout area adjacent the rear of the delta. The base of this cutout area is substantially of the same width as the base of the delta, and the apex thereof is located on the planform axis of symmetry of the basic delta at about the longitudinal midpoint thereof, thereby defining a swallow tail configuration. Since substantially all of the lift on a delta configuration is developed along the leading edges, this cutout eliminates a "dead" area of the wing which would otherwise contribute heavily to total drag while producing very little lift at high supersonic speeds. The two long pointed tails of the "Swallow" configuration are hinged adjacent their forward extremities to the delta forebody thereof so that they may be swept forward to a position substantially at right angles to the flight path and defining a substantially continuously straight wing trailing edge to provide a greatly increased aspect ratio for low speed flight. This configuration is further characterized by the installation of the propulsion engines in nacelle pods positioned on the variable sweep wing portions at approximately 75% of the wing semispan in the low aspect ratio attitude, and by the provision of means for pivoting these pods in the horizontal plane to maintain a fore and aft direction upon change in wing sweep angle and also for pivoting the pods about a horizontal axis normal to the line of flight to obtain pitching control when the pods are pivoted together and rolling control when pivoted in opposition to each other. It was contemplated that as the angle of sweep of the hinged wing sections varied, the airplane center of gravity, due to movement of the mass of these wing sections and the engines, would substantially follow the movement of the airplane aerodynamic center and would maintain its relative longitudinal distance therefrom. Tests of this configuration, however, indicate longitudinal instability at relatively low angles of attack in the high sweep attitude and at moderate angles of attack in the low sweep attitude, lack of significant control due to engine pod deflection, and the possibility of complete loss of control in the event of engine failure; all of which pose major problems in making the "Swallow" planform operational.

In a modified version of the "Swallow" configuration which has been heretofore suggested, the pivotally mounted outboard propulsion engines are omitted. This configuration is defined by a forward delta portion and trailing "tail" portions pivotable in their entirety about points adjacent their forwardmost extremities from a slightly swept to a highly swept position. At the end of each "tail" is provided a vertical stabilizer pivotally connected thereto and so interconnected with the "tail" pivoting mechanism as to maintain its alignment relative to the delta portion and parallel to the aircraft flight path during pivoting of the "tail" portions. Significant disadvantages also have been found to be inherent in this configuration. Pivoting the entire "tail" portions of the "Swallow" causes a marked variation in the position of the aerodynamic center relative to the airplane center of gravity, causing instability at low sweep angles and too much stability, with consequent loss of maneuverability, at high sweep angles. Further, this modification of the "Swallow" configuration requires heavy, complex wing pivoting apparatus for pivoting the entire "tail" portions. Thus the modified "Swallow" configuration is not considered to provide a satisfactory solution of the variable sweep concept problem.

The disappointing results of the test programs and studies hereinbefore mentioned have resulted, over the past several years, in a general rejection of the variable sweep wing concept by the manufacturers and users of supersonic aircraft. In view of the potential of this concept, however, research efforts to solve the problems connected therewith were continued. In essence, these efforts were directed toward the development of an aircraft having variable aspect ratio, variable sweep wings so designed that varying sweep angle would not require unduly complex or heavy mechanism, and would not cause significant variation in the relative position of the aircraft center of gravity and the aerodynamic center, thus obviating any need for longitudinal translation of the wings. As a result of this further experimentation, the present invention was made. Basically, this invention contemplates the provision of a substantial inboard fixed "swallowtail" wing portion and a smaller outboard pivotal "swallowtail" wing portion connected thereto, and is considered to provide a variable sweep, variable aspect ratio wing planform for a supersonic aircraft which obviates the need for wing root translation and complex mechanisms, while avoiding intolerable shifts in aircraft aerodynamic center.

Concepts similar to that here involved have been applied by subsequent independent inventors in two highly successful improvement inventions, one of which is disclosed in the application for U.S. Letters Patent of W. J. Alford, Jr., and E. C. Polhamus, Serial No. 41,455, filed July 7, 1960, now Patent Number 3,053,484, and the other disclosed in the application for U.S. Letters Patent of T. A. Toll, Serial No. 51,473, filed August 23, 1960, now Patent Number 3,064,928. These inventions apply similar concepts to that of the present invention to rear empennage and forward empennage aircraft, respectively. Thus it may be seen that the present invention is one not only of significant advancement in the art, but also of a wide applicability in the field of supersonic aircraft.

Accordingly, it is an object of the present invention to provide a new and improved variable aspect ratio wing planform for an aircraft.

Another object of the instant invention is the provision of a new and improved variable leading edge sweep wing planform for a supersonic aircraft.

A further object of this invention is the provision of a new and improved variable sweep wing planform for a supersonic aircraft operable to vary aspect ratio without adversely affecting the control and stability characteristics of the aircraft.

A still further object of the present invention is to provide a new and improved variable sweep wing planform for maximizing aspect ratio for subsonic takeoff, climb, cruise, descent, and landing.

Still another object of the instant invention is the provision of a new and improved variable sweep wing planform for a supersonic aircraft for minimizing aspect ratio during supersonic cruise.

According to the present invention, the foregoing and other objects are attained by providing in an aircraft a wing planform including a forward delta portion having a swept leading edge and a straight, transversely disposed rearward extremity including a central trailing edge, and wing sections extending rearwardly and outwardly from the rearward extremity of the delta forward portion on opposite outboard sides of the trailing edge thereof, including fixed inboard wing panels having leading edges forming linear extensions of the delta portion leading edges and trailing edges commencing at the outboard ends of the delta portion trailing edge and swept rearwardly and outwardly at an angle less than the sweep angle of the fixed wing panel leading edges. The wing sections also include outboard wing panels pivotally mounted on the inboard wing panels to rotate in the wing areal plane between a position in which the leading edges thereof form linear extensions of the inboard wing panel leading edges and a position wherein the leading edges thereof are substantially perpendicular to the longitudinal axis of symmetry of the delta portion; provision being made whereby pivotal movement of the outboard wing panels to the position of leading edge perpendicularity with the delta portion longitudinal axis of symmetry is accompanied by an increase in overall wing surface area.

Figure 2:
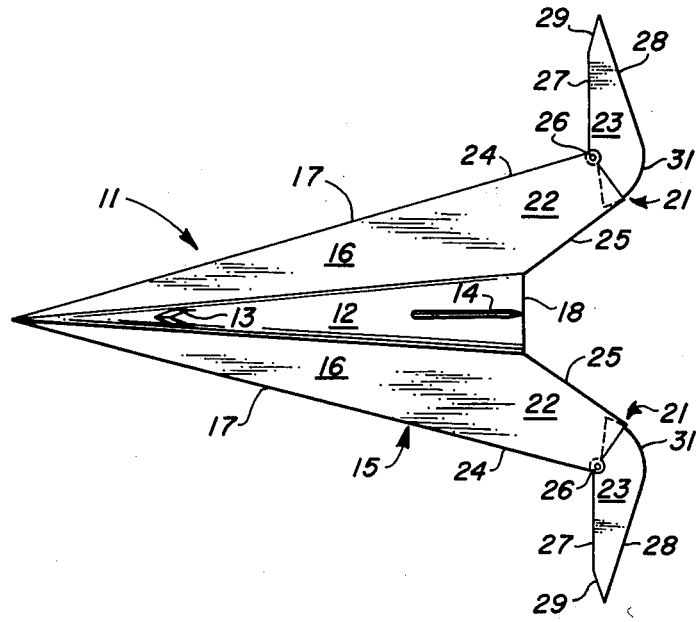

A more complete appreciation of the invention and many of the attendant advantages thereof will be readily apparent as the same becomes better understood by reference to the following detailed description when considered in connection with the accompanying drawing wherein:

FIG. 1 is a plan view of a variable sweep wing aircraft with the wing thereof disposed in a low aspect ratio position; and FIG. 2 is a plan view of the aircraft with the wings thereof disposed in high aspect ratio position.

Referring now more particularly to the drawing, wherein like reference numerals designate identical parts throughout the several views, there is shown in FIG. 1 by way of example a variable sweep delta wing "Swallow" aircraft configuration, generally designated by the reference numeral 11. Aircraft 11 is provided with any conventional fuselage 12 which may include a pilot cockpit surmounted by a conventional canopy 13 and one or more vertical stabilizers 14. Since fuselage 12, the cockpit with canopy 13, and vertical stabilizer 14 are only incidentally related to the present invention, they are shown only schematically, and it should be noted that although aircraft 11 is shown as being of the low winged type, the relative position of wing and fuselage may be vertically varied conventionally within the scope of this invention.

Aircraft 11 is provided with a wing arrangement generally indicated by reference numeral 15 including a delta portion 16 having swept leading edges 17 and a transversely disposed after extremity including a straight central trailing edge 18 positioned symetrically with respect to the longitudinal axis of symmetry of vehicle 11 and constituting a forward main wing section. Extending rearwardly from the after extremity of delta portion 16 at either side of delta portion trailing edge 18 are tail portions 21 of wing system 15, the term "tail" being used to denote these portions because of their position in the "Swallow" configuration. Tail portions 21 are each comprised of fixed inboard panels 22 and pivotal outboard panels 23. Inboard panels 22 have swept leading edges 24 forming a linear extension of delta portion leading edge 17, and trailing edges 25 which may be swept along a line converging outwardly toward leading edges 24 of inboard panels 22. The surface area of inboard panels 22 is less than that of delta portion 16.

Outboard panels 23 may be pivotally connected to inboard panels 22 for rotative movement in the wing areal plane about pivot points 26; utilizing any suitable pivot elements, not shown such as, by way of example, pin pivots, spherical or ball joints, or a pin surrounded by a large diameter bearing plate. Pivot points 26 are located as nearly adjacent the dividing line between panels 22 and 23 as it is physically feasible to place them, and are further similarly positioned adjacent the wing leading edges. Conventional simple prime movers and linkage may be provided to afford selective relative pivotal movement of the inboard and outboard panels. Since the details of these motion producing elements and pivot elements form no part of the present invention, they are not shown, but it should be noted that due to the relatively small portion of wings 15 to be moved, these elements may be of simple, lightweight nature in comparison with prior art devices for performing a similar function.

Outboard panels 23 have leading edges 27 which, in the position shown in FIG. 1, form linear extensions of leading edges 17 and 24 of delta portion 16 and inboard panels 22, respectively. Outboard panels 23 are further provided with trailing edges 28 which, in the FIG. 1 position, form continuations of the trailing edges 25 of inboard panels 22, and thus converge outwardly toward the leading edges of the outboard panels. Tip sections 29 may be provided for outboard panels 23. The surface area of outboard panels 23 is less than that of inboard panels 22.

During supersonic flight, a highly swept, low aspect ratio wing planform such as shown in FIG. 1 is desirable, as discussed hereinbefore. However, during certain aircraft manuevers, such as subsonic takeoff, climb, cruise, descent and landing, it is more advantageous to provide a wing planform having a high aspect ratio, as also discussed hereinbefore. Moreover, it is important that this high aspect ratio be attainable without significant variation in the position of the aerodynamic center of the aircraft.

Turning now to FIG. 2, it may be seen that the present invention provides a variable sweep wing aircraft which possesses such capabilities. During the subsonic maneuvers hereinbefore referred to, outboard panels 23 may be pivoted through the instrumentality of the means aforementioned to the position shown in FIG. 2, wherein outboard panel leading edges 27 lie along a line substantially perpendicular to the longitudinal axis of symmetry of aircraft 11. In sweeping forward to the FIG. 2 position, outboard panels 23 provide a slight increase in overall exposed wing surface area, at or about the location of circular boundary 31 of outboard panels 23, which in the position shown in FIG. 1 may be disposed within inboard panels 22. This increase in effective wing area tends to minimize the aerodynamic center shifting effect of pivoting the outboard panels. Pivotal movement of only a small portion of the aircraft wings such as outboard panels 23, while it affords a significant variation in aspect ratio, causes only a small, relatively negligible movement of the aerodynamic center of aircraft 15 relative to center of gravity shift, and thus wing translation with attendant complex, heavy mechanisms therefor is not required to insure adequate longitudinal and directional stability, thus avoiding the shortcomings of heretofore suggested variable sweep wing aircraft. Further it should be noted that according to the present invention, the necessity of placing outboard engines or similar large masses on the wing panels is obviated.

In operation, aircraft 11 would begin its takeoff run with wings 15 positioned in the high aspect ratio attitude shown in FIG. 2 of the drawing, and wings 15 would remain in this attitude throughout the takeoff run and the portion of the climb accomplished at subsonic speeds. The outboard panels 22 of wings 15 would then be rotated to the position shown in FIG. 1 of the drawing for acceleration through the transonic speed range to the desired cruise Mach number. Upon completion of the supersonic cruise portion of the journey and deceleration of aircraft 11 to subsonic speeds, wing panels 22 would be swept forward to their high aspect ratio position and maintained therein during descent, loiter, and landing. Additionally, in the event of any flight plan requiring prolonged operation of aircraft 11 at subsonic speeds, the wings 15 may be maintained at high aspect ratio attitude to obtain maximum subsonic flight efficiency.

It is to be understood that aircraft 11 may be provided with any conventional propulsion engines, pitch, roll and yaw control surfaces, landing gear and the like equipment normally found in such aircraft without departing from the scope of this invention. Such equipment is not shown, since it forms no part of the present invention.

Obviously many modifications and variations of the present invention are possible in the light of the above teachings. It is therefore to be understood that within the scope of the apended claims the invention may be practiced otherwise than as specifically described.

What is claimed as new and desired to be secured by Letters Patent of the United States is:

1. In combination with an aircraft, a wing arrangement comprising a forward delta main wing section, inboard wing panels connected to said main wing section in fixed relationship thereto, said inboard wing panels being of substantially smaller surface area than said main wing section, and rearwardly disposed outboard wing panels pivotally mounted on said inboard panels for rotative movement in the wing areal plane to vary sweep, span and aspect ratio of said wing arrangement, said outboard wing panels being of substantially smaller surface area than said inboard wing panels.

2. A supersonic aircraft with variable aspect ratio, variable sweep, and variable span wings, comprising a forward delta wing having swept leading edges and a transversely disposed after extremity including a straight central trailing edge, inboard wing panels rigidly connected to the after extremity of said delta wing, and an outboard wing panel pivotally connected to each of said inboard wing panels for rotative movement in the wing areal plane about a pivot point substantially adjacent the dividing line between each said inboard wing panel and said connected outboard wing panel.

3. The supersonic aircraft set forth in claim 2 wherein said inboard wing panels have leading edges and trailing edges, said inboard panel leading edges forming linear continuations of said delta wing leading edges.

4. The supersonic aircraft set forth in claim 3 wherein said inboard wing panel trailing edges are swept along a line converging outwardly toward said inboard wing panel leading edges.

5. The supersonic aircraft set forth in claim 3 wherein said outboard wing panels have leading edges and trailing edges and wherein each of said pivot points is disposed substantially adjacent said leading edges of one of said inboard panels and one of said outboard panels, said outboard wing panels each being rotatable from a low aspect ratio position in which the leading edges thereof form linear continuations of said inboard panel leading edges to a high aspect ratio position in which said outboard wing panel leading edges lie generally perpendicular to the longitudinal axis of symmetry of said aircraft.

6. The supersonic aircraft set forth in claim 5 wherein said outboard wing panel trailing edges when in said low aspect ratio position form a linear continuation of the inboard wing panel trailing edges.

7. In combination with a supersonic aircraft, a variable sweep, variable aspect ratio wing arrangement, comprising a forward delta wing having swept leading edges and a transversely disposed after extremity including a straight central trailing edge, and a tail portion extending rearwardly and outwardly from said forward delta wing after extremity on each side of said straight trailing edge; said tail portions each comprising, an inboard wing panel rigidly connected to said delta wing after extremity having a leading edge forming a linear extension of said forward delta wing swept leading edge and, an outboard wing panel having a leading edge and a trailing edge pivotally connected to said inboard wing panel for rotative movement in the wing areal plane from a high aspect ratio, low sweep position, in which said leading edge of said outboard wing panel forms a continuation of said inboard wing panel leading edge generally perpendicular to the longitudinal axis of symmetry of said aircraft, to a low aspect ratio, high sweep position, in which said leading edge of said outboard wing panel forms a linear extension of said inboard panel leading edge, said outboard wing panels being of smaller surface area than either of said inboard wing panels or said delta wing.

8. The supersonic aircraft according to claim 7 wherein said outboard wing panels are so connected to said inboard wing panels that the effective wing area of said outboard wing panels and the overall wing span are both increased upon movement of said outboard wing panels from said low aspect ratio position to said high aspect ratio position.

9. In combination with a supersonic aircraft having a centrally disposed fuselage, a wing arrangement comprising: a main wing section extending substantially the length of said fuselage presenting an equiangular swept leading edge on opposite sides of said fuselage; inboard wing panels fixedly connected to said main wing section having swept leading edges forming linear continuations of said main wing section leading edges and having swept trailing edges aft of said fuselage; outboard wing panels having leading edges and trailing edges pivotally mounted on said inboard panels for rotative movement in the wing areal plane to vary sweep and span of said wing arrangement between a minimum aspect ratio position and a maximum aspect ratio position whereby, when said outboard wing panels are in said minimum aspect ratio position said leading edges thereof form linear extensions of said inboard panel leading edges and said trailing edges of said outboard wing panels form linear extensions of said inboard panel swept trailing edges and, when rotated forward to said maximum aspect ratio position, said outboard panels increase the wing span of said wing arrangement and said outboard panel leading edges lie generally perpendicular to the longitudinal axis of symmetry of said aircraft.

References Cited in the file of this patent

UNITED STATES PATENTS

| 2,961,196 | Atkinson | Nov. 22, 1960 |
| 2,972,898 | Hartel | Feb. 28, 1961 |

FOREIGN PATENTS

| 856,763 | France | Apr. 1, 1940 |
| 1,104,478 | France | June 15, 1955 |
| 745,281 | Great Britain | Feb. 22, 1956 |